Sept. 2, 1952            M. ENGLER            2,609,311
SUPPLEMENTAL SUPPORT FOR ASSEMBLING PLY MATERIAL BANDS
Filed Feb. 28, 1950            2 SHEETS—SHEET 1
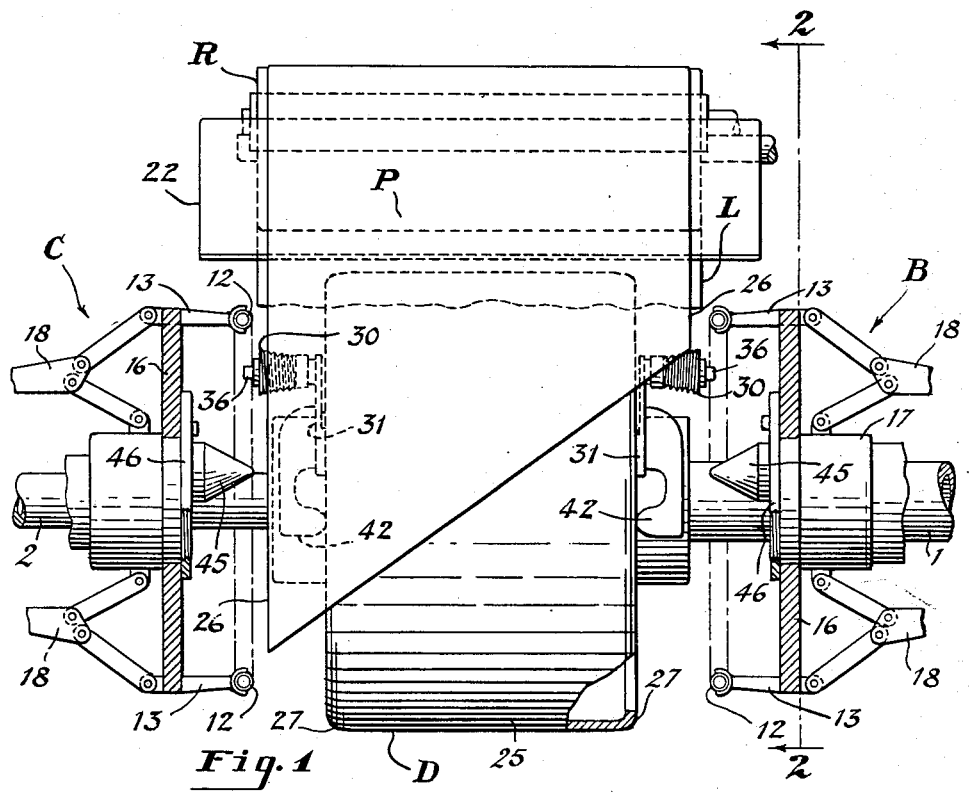
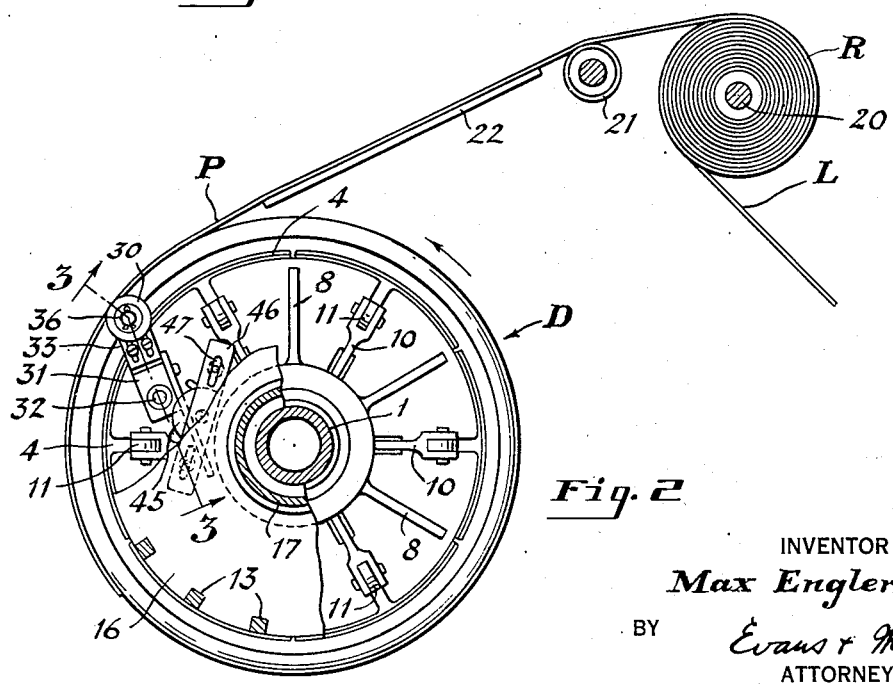
INVENTOR
*Max Engler*
BY *Evans & McCoy*
ATTORNEYS

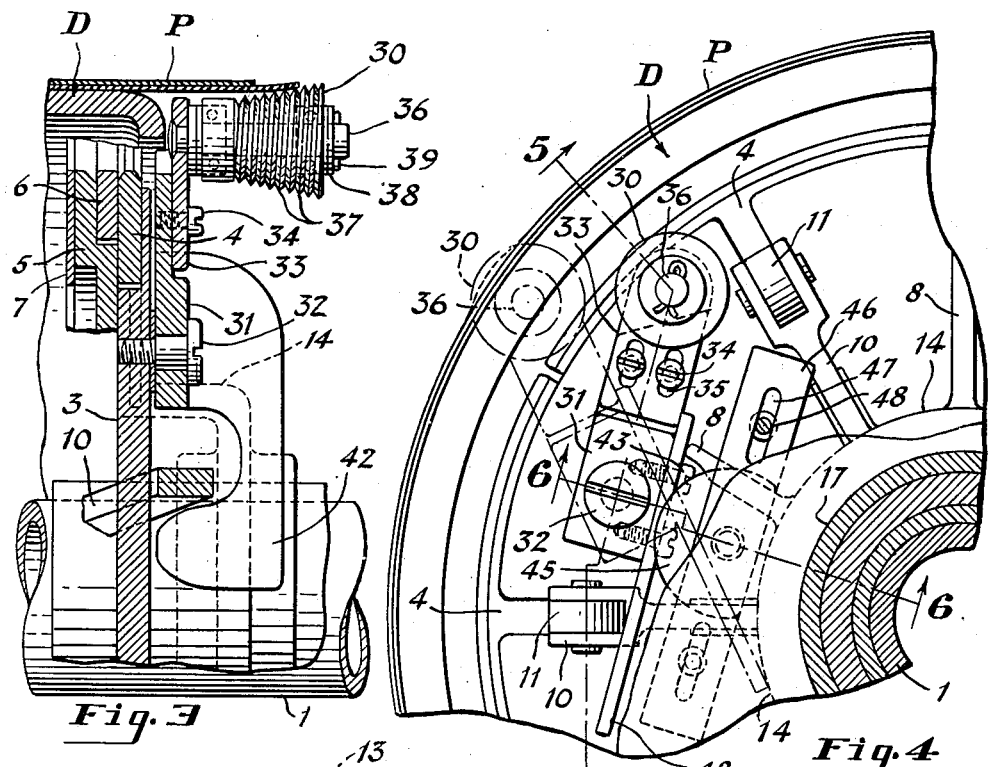
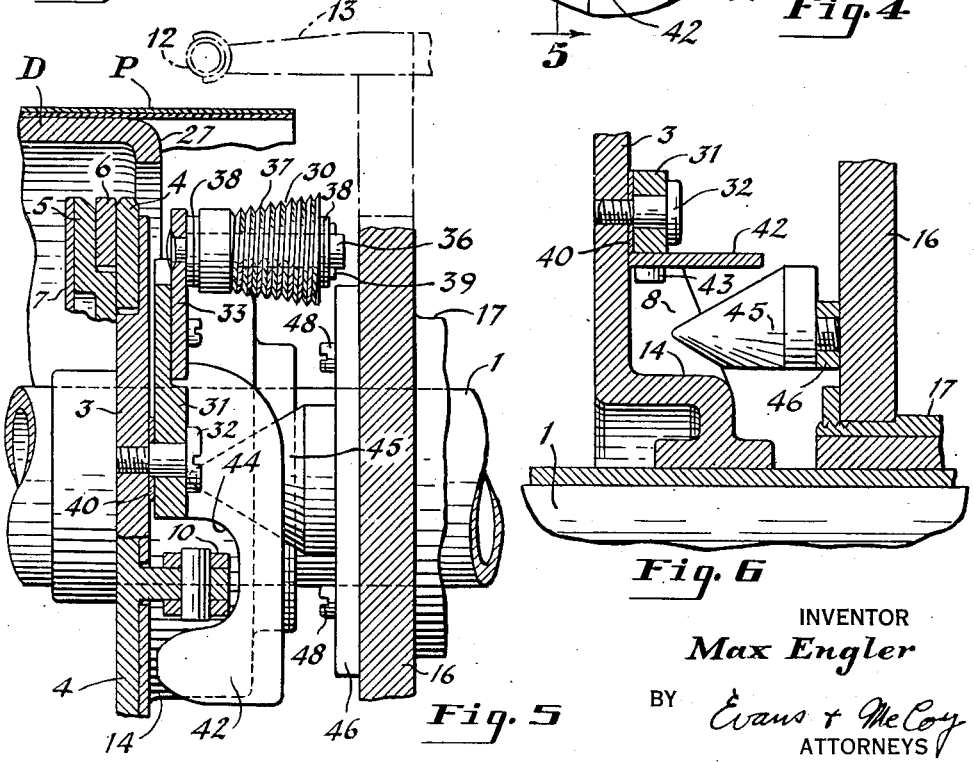

Patented Sept. 2, 1952

2,609,311

UNITED STATES PATENT OFFICE 2,609,311

SUPPLEMENTAL SUPPORT FOR ASSEMBLING PLY MATERIAL BANDS

Max Engler, Akron, Ohio, assignor to The General Tire and Rubber Company, Akron, Ohio, a corporation of Ohio Application February 28, 1950, Serial No. 146,718

20 Claims. (Cl. 154—9)

This invention relates to the art of assembling strips of rubberized ply material or the like into endless bands such as are employed in the manufacture of pneumatic vehicle tires. More particularly, the invention is concerned with means for supporting portions of ply material strips which project axially beyond or over the shoulders of rotatable drums or building forms during the laying-up or assembling of layers of ply material about such forms.

It is one of the principal objects of the invention to provide support means for ply material projecting beyond or over the ends of a building drum or form so that such projecting portions of the ply material are constrained to travel through a path having a radius equivalent to that of the drum. More specifically, it is sought to provide such support means for ply material projecting beyond the shoulders of the building drum to hold or move a localized portion of such ply material outwardly against a subsequently applied layer or layers of ply material for adhesion thereagainst.

Another object is to provide a ply supporting device for use adjacent the shoulder of a tire building drum to engage the marginal portions of ply material projecting beyond the drum shoulder so as to support such ply material during the assembling or laying-up of subsequent ply layers about the drum.

According to one aspect of this phase of the invention, it is sought to provide a ply support in the form of a free turning roller that is movable into and out of supporting position adjacent the drum shoulder so as to be rotated by ply material carried by the drum.

Another object is to provide a ply support for use in connection with automatic tire building machines, such support preferentially being adapted for mounting as an attachment on machines of present design so as to require a minimum modification or alteration thereof.

A further object is to provide, for use in combination with a ply building drum or form, a ply support so mounted as to be swingable into and out of an operative position about the substantially parallel rotational axis of the drum so as to clear the drum shoulders for tire building operations; the support also being mounted for bodily shifting movement along an axial path relative to the drum so as to be removable when collapsing the drum for removal of a completed ply band. As a more specific aspect of the invention, the combination includes means for insuring positive retraction or swinging of the support away from the drum shoulder after completion of the placement of the ply material about the drum and prior to the operation of the ply turning instrumentalities of the automatic machine over the drum shoulder.

Other objects and advantages relating to simplicity in design and construction and certain novel features residing in combinations and arrangements of parts are set forth in the following detailed description. This description is made in connection with the accompanying drawings forming a part of the specification and in which like parts throughout the several views are indicated by the same letters and numerals of reference.

In the drawings:

Figure 1 is a front elevational view partly diagrammatic, partly in section, and with parts broken away and removed showing the combination of the present invention in which ply supports are mounted at the ends of the building drum of a tire building apparatus;

Fig. 2 is an end elevational view, partly in section, partly diagrammatic and with parts broken away and removed, showing the building drum and ply material supply roller of Figure 1, this view being taken substantially along the line indicated at 2—2 of Figure 1;

Fig. 3 is a sectional detail, with parts removed, taken substantially along the line indicated at 3—3 of Fig. 2 and enlarged with respect to that figure;

Fig. 4 is an elevational view of a portion of one end of the tire building drum and the ply folding instrumentalities associated therewith showing the relationship between the ply supporting device of the present invention and the drum shoulder, this view being drawn approximately to the same scale as Fig. 3;

Fig. 5 is a sectional detail, with parts removed, taken substantially along the line indicated at 5—5 of Fig. 4; and Fig. 6 is a sectional detail with parts removed, taken substantially along the line indicated at 6—6 of Fig. 4.

The ply supporting device of the present invention can be used to advantage in various types of tire building machines and is of particular utility in machines of the type shown, for example, in United States Patent 2,455,038 issued November 30, 1948, on Apparatus for Building Tires. The structural features of the device and its principle of operation are of general utility, however, in the art of assembling ply material bands on rotatable forms.

The components of the tire building machine shown are constructed generally in accordance with the disclosure in the patent referred to, only parts necessary or convenient to the understanding of the operation of the present ply support device being shown in the present drawings.

A collapsible and rotatable building drum D is mounted on a horizontal shaft 1 journaled in a suitable supporting structure. Bead building heads B and C are operative at and adjacent the opposite ends or shoulders of the drum to perform the customary ply turning and bead setting operations. The bead head B is carried by the shaft 1 and a stationary part of the supporting structure while the bead head C is carried on a shaft 2 journaled in a carriage which shifts the shaft and the bead building head axially toward and away from the drum so that a completed tire band can be removed from the latter.

The bead building heads B and C, which are essentially the same, each includes a disc assembly mounted to move axially into and out of the end of the drum. This disc assembly comprises a supporting disc 3 slidable axially along the shaft and outer, inner, and intermediate expansible discs 4, 5 and 6, each of which is composed of radially movable segments. The discs 4, 5 and 6 are held in place between the main or supporting disc 3 and an inner retaining plate 7 that is secured to and spaced inwardly from the supporting disc 3. Radial movements are imparted to the segments of the disc 4 as by swinging links 10 pivoted at their outer ends to lugs 11 on the outer faces of the disc. The inner ends of the links are pivoted to lugs on a collar slidable along the supporting shaft. Movements of the collar along the shaft toward or away from the disc 3 causes the segments of the disc 4 to be moved simultaneously radially outwardly or inwardly to expand or contract the disc.

For folding the end edges of a circular band of fabric or ply material on the drum inwardly of the shoulders of the drum, each of the bead building heads B and C includes a contractible folder ring 12 which may take the form of a helical coil spring. This spring is carried by axially extending arms 13 rigidly attached to the outer ends of radially slidable bars carried by a disc 16 having a hub 17 slidable along the shaft or sleeve that supports the bead building head. Suitable means including linkage 18 is provided for imparting simultaneous radial outward movements to the ring supporting arms 13 for expanding the spring ring 12 to a diameter greater than that of the drum D.

In the building of a tire band on a rotatable form such as the drum D, a strip of bias cut cord material is wrapped about the drum to form a first annular ply layer. Successive ply layers are superimposed on the first, the directions of the cords being reversed in succeeding layers. The ply material strips may be preformed and supplied to the operator of the building machine by an assistant, the ply material may be supplied in the form of a continuous strip suitably festooned or, as shown, it may be supplied in a roll R. This ply material supply roll is supported to turn freely about an axis paralleling the rotational axis of the drum D, a shaft 20 being suitable for the purpose. This shaft may be suitably supported by fixed journals or it may be one of the shafts of a so-called servicer which carries a plurality of such shafts and ply material supply rolls. In accordance with the customary practice in the handling of ply material supply rolls, the ply material is wound between the turns of a fabric liner L which is drawn off the supply roll R simultaneously with ply material P. To wrap or place a layer of ply material about the drum D the operator draws the leading end of the ply material P off the supply roll R over a feed or idling support roller 21 and a board or table 22, the roller 21 and the board 22 being suitably supported by either the frame of the tire building machine or the servicer which carries the ply material supply roll R. With the leading end of the ply material placed against cylindrical face 25 of the drum D, rotation of the latter draws the ply material off the supply roll. After one revolution or turn of the drum, the latter is stopped, the ply material of the drum severed from the strip and the two ends on the drum are adhered or stitched together to form a continuous or annular band.

After the first ply band has been thus laid up or assembled about the drum, it is customary to lay up a second and even a third band in a similar manner and in superimposed relation. The direction of the cords in the successive ply layers is reversed or alternated by changing the supply roll R in accordance with conventional practice.

As shown in Fig. 1, the ply material P is considerably wider than the cylindrical drum face 25 so that marginal portions 26 of the ply material project or extend axially beyond circular drum shoulders or ends 27. As each succeeding ply material layer or band is wrapped about the drum it is, over the major portion of its extent or area, drawn snugly against the surface of the underlying ply band by reason of the tension in the ply material and the smooth cylindrical supporting face 25 of the underlying drum. Beyond the drum shoulders 27, however, the projecting portions 26 of ply material are unsupported and the underlying layer or layers may thus sag or droop radially inwardly and the several ply bands are not properly adhered together at their margins.

The present invention is principally concerned with the provision of support means for properly positioning those portions of the ply material P which project axially beyond the drum shoulders 27. It has been found unnecessary to support these projecting portions of ply material about the entire circumferential extent of the drum, satisfactory results being obtained by localized support such as provided by rollers 30.

These rollers are mounted adjacent the drum shoulders 27 in such a manner as, in effect, to provide a localized extension or continuation of the ply material supporting surface of the drum face 25, such supporting extension extending about only a fractional portion of the circumference of the drum. The ply supporting means or rollers engage the under or concave side of marginal portions of the ply material which project beyond the drum shoulders, so as to hold such projecting ply material portions outwardly against ply material layers subsequently laid up or wrapped about the drum.

Although many of the advantages of the invention are to be realized by locating such rollers in any convenient location about the circular drum shoulders, and while there are, in certain applications of the invention, additional advantages in utilizing a plurality of such rollers or supports spaced about the circumference of each drum shoulder, it has been found satisfactory and of optimum benefit to employ a single support or roller at each drum shoulder located approximately at the point of tangency at which ply material P is fed onto the drum D or, as shown in Fig. 2, a few degrees beyond such point of tangency in the direction of drum and ply material travel. The direction of drum travel or rotation is indicated by the arrow in Fig. 2.

The ply supports or rollers 30 are mounted for shifting movement into and out of the operative positions shown in Figs. 1, 2 and 3 so that they may be withdrawn from the drum shoulders during certain steps or operations in the tire building process. The mounts for the rollers may take various forms and may be carried by any convenient frame components of the tire building machine. As one of the important phases of this invention, however, the ply material support rollers are swingably mounted on the discs 3 of the bead building heads B and C. Tilt arms 31 are pivoted on shouldered cap screws 32 threaded into the discs 3 so as to turn about horizontal axes substantially parallel to the rotational axis of the drum D. Spacing washers 40 are received on the mounting screws between the tilt arms and the discs. Each of the tilt arms is of adjustable length construction and includes a slidable end portion 33 secured to the main portion of the tilt arm by screws 34 that extend through elongated slots 35 in the portion 33, permitting the latter to be shifted longitudinally when the screws are loosened. A shouldered shaft 36 for rotatably mounting the roller extends through an aperture in the end of the arc extension 33 and is riveted over so as to secure the shaft rigidly thereto in cantilever fashion.

The rollers 30 are each preferably of generally frustoconical shape and of greater axial length than maximum diameter. The surface of each roller is grooved, providing sharp crested circumferentially extending ridges 37. The grooves may comprise one or more continuous spirals or helices so that the grooves and ridges somewhat resemble a tapered thread. The rollers are mounted to turn freely on the shafts 36 between antifriction washers 38 and are retained by cotter pins 39. The outer or large diameter ends of the rollers are positioned axially outward of or beyond the free edges of the projecting ply material P. Although the major portion of each of the rollers is wholly within the diameter of the drum D the rollers are preferably adjusted so that their large diameter ends extend radially outward beyond the building drum diameter, as shown in Fig. 3, so as to distend or stretch the ply material slightly and thereby provide a more effective compacting and stitching together of the superimposed layers of ply material.

A rigid metal extension plate 42 is secured to each of the tilt arms 31 as by cap screws 43. By engaging parts of the disc 3 this plate serves as a means for limiting the swinging movement of the tilt arm. Portions of the extension plates 42 are relieved or cut away as indicated at 44 to clear parts such as the links 10 of the operating mechanisms of the bead building heads. When the rollers 30 are in operative position at the drum shoulders, as indicated with respect to one of the rollers by the broken lines of Fig. 4, the extension plates 42 on the supporting tilt arms are engaged against the hubs 14 of the discs 3 which carry the ply support rollers. As shown in Figs. 2 and 4 the center of gravity of each ply support roller assembly is thus displaced beyond dead center or outwardly of the pivot axis on the supporting stud 32, or to the left as viewed in the figures referred to. Upon such movement of the support rollers to their operative positions, this movement normally being performed manually by the operator of the tire building machine, the rollers remain in extended or operative positions by reason of their movement beyond their dead center positions. The action of gravity tends to retain the rollers in their extended or operative positions, as limited by engagement of the extension plates 42 against the hubs 14. The frictional engagement or drag of ply material against the rollers 30 during the drawing of the ply material onto the drum D also tends to hold the rollers in the extended positions shown.

During the ply turning and bead placing operations performed at and over the drum shoulders, each of the ply support rollers 30 is retracted to an inactive position such as indicated by the full lines of Figs. 4 and 5. This retraction of the rollers is effected by a swinging or tilting of the arms 31 on the pivot studs or screws 32, the limit of movement being determined by engagement of the extension plates 42 against one of the reinforcing ribs 8 of the discs 3 (see Fig. 4).

An important feature of the present invention is the provision of means for positively effecting the retraction of the ply support rollers 30 to their inoperative or inactive positions prior to movement of the ply folding rings 12 over the drum shoulders. This retraction or inward shifting of the ply support rollers is effected by cam members or cones 45 secured on mounting plates 46 attached to the faces of the supporting discs 16. The plates 46 are formed with elongated slots 47 that receive attaching cap screws 48 permitting mounting adjustment of the cones 45. These cones are so positioned that their inclined faces engage the edges of the extension plates 42 of the tilt arms when the supporting discs 16 are slid relatively toward the discs 3 along the main supporting sleeves or shafts 1 and 2. The relative movement of the cones against the extension plates 42 at points spaced from the pivot screws 32 acts against the latter to swing the roller supporting arms 31 in a clockwise direction as viewed in Figs. 2 and 4. This positive movement of the tilt arms is continued past their dead center positions and until the arms are in fully retracted positions substantially against the limiting stops formed by the ribs 8.

By the positive retraction arrangement just described, possible damage to the apparatus and injury to the operator is avoided and the operator, relieved, as he is, of the duty of retracting the ply support rollers, is free to perform other operations in connection with the tire building process. This feature has numerous advantages, particularly in connection with the operation of automatic and semi-automatic tire building machines wherein the sequence of the tire building operations is frequently governed by a master control and timing arrangement. The serious consequences of neglect or oversight on the part of the operator to return the ply support rollers to inactive position after laying-up the plies are avoided. The apparatus is inherently capable of automatically returning these devices to the indrawn positions where they do not interfere with any of the bead building operations.

In accordance with the patent statutes the principles of the present invention may be uti-

What I claim and desire to secure by Letters Patent the United States is:

1. In combination in a ply band builder which includes a rotatable form about which strip ply material is drawn, the form having a substantially cylindrical ply receiving surface substantially concentric to the rotational axis of the form, a ply support roller and means rotatably mounting such roller at an end of the form in position to engage the concave side of a marginal edge portion of ply material projecting beyond the form end, the roller being disposed substantially wholly within the cylinder developed by the surface of the form, and the roller including a circular element substantially tangent to said cylinder.

2. In combination in a ply band builder which includes a rotatable form about which strip ply material is drawn, the form having a substantially cylindrical ply receiving surface substantially concentric to the rotational axis of the form, a ply support roller and means rotatably mounting such roller at an end of the form in position to engage the concave side of a marginal edge portion of ply material projecting beyond the form end, the roller being disposed substantially wholly within the cylinder developed by the surface of the form, the roller including a circular element substantially tangent to said cylinder and said roller being of generally frusto-conical shape.

3. In combination in a ply band builder which includes a rotatable form about which strip ply material is drawn, the form having a substantially cylindrical ply receiving surface substantially concentric to the rotational axis of the form, a ply support roller and means rotatably mounting such roller at an end of the form in position to engage the concave side of a marginal edge portion of ply material projecting beyond the form end, the roller being disposed substantially wholly within the cylinder developed by the surface of the form, the roller including a circular element substantially tangent to said cylinder and said roller being of generally frusto-conical shape and having circumferentially extending surface grooves.

4. In combination in a ply band builder which includes a rotatable form about which strip ply material is drawn, the form having a substantially cylindrical ply receiving surface substantially concentric to the rotational axis of the form, a ply support roller and means rotatably mounting such roller at an end of the form in position to engage the concave side of a marginal edge portion of ply material projecting beyond the form end, the roller being disposed substantially wholly within the cylinder developed by the surface of the form, the roller including a circular element substantially tangent to said cylinder and said roller being of greater length than diameter.

5. In combination in a ply band builder which includes a rotatable form about which strip ply material is drawn, the form having a substantially cylindrical ply receiving surface substantially concentric to the rotational axis of the form, a ply support roller and means rotatably mounting such roller at an end of the form in position to engage the concave side of a marginal edge portion of ply material projecting beyond the form end, the roller being disposed substantially wholly within the cylinder developed by the surface of the form, the roller including a circular element substantially tangent to said cylinder and said roller being of greater length than diameter and having circumferentially extending surface grooves.

6. In combination in a ply band builder which includes a rotatable form about which strip ply material is drawn, the form having a substantially cylindrical ply receiving surface substantially concentric to the rotational axis of the form, a ply support roller and means rotatably mounting such roller at an end of the form in position to engage the concave side of a marginal edge portion of ply material projecting beyond the form end, the roller being disposed substantially wholly within the cylinder developed by the surface of the form, the roller including a circular element substantially tangent to said cylinder and said roller being of generally frusto-conical shape and having a greater axial length than diameter.

7. In combination in a ply band builder which includes a rotatable form about which strip ply material is drawn, the form having a substantially cylindrical ply receiving surface substantially concentric to the rotational axis of the form, a ply support roller and means rotatably mounting such roller at an end of the form in position to engage the concave side of a marginal edge portion of ply material projecting beyond the form end, the roller being disposed substantially wholly within the cylinder developed by the surface of the form, the roller including a circular element substantially tangent to said cylinder and said roller being of greater length than diameter, of generally frusto-conical shape and having circumferentially extending surface grooves.

8. In combination in a ply band builder which includes a rotatable form about which strip ply material is drawn, a ply support roller and means mounting such roller to rotate about an axis substantially paralleling the rotational axis of the form, the roller being positioned substantially as a continuation of the ply material supporting face of the form to engage and support a marginal edge portion of ply material projecting beyond the form face.

9. In combination in a ply band builder which includes a rotatable form about which strip ply material is drawn, a ply support member and means mounting such member substantially as a continuation of the ply material contacting surface of the rotatable form, said support member being of relatively short extent in the direction of movement of ply material being drawn about the form to contact and support a relatively small area portion of ply material projecting from the form, and the mounting means comprising a member swingable in a plane substantially normal to the rotational axis of the form and about an axis substantially paralleling said rotational axis for shifting the support member between the continuation position and a retracted position in which the support member is closer to the rotational axis of the form than in the continuation position.

10. In combination in a ply band builder which includes a rotatable form about which strip ply material is drawn, a ply support member and means mounting such member to swing about an axis substantially paralleling the rotational axis of the form between an operative position in which it extends substantially as a continuation of the ply material supporting face of the form and a retracted position in which it is shifted away from said operative position.

11. In a ply band builder having a rotatable form about which strip ply material is drawn and turning and folding instrumentalities movable relative to one another and relatively toward and away from the form, a support member and means mounting the same on one of the instrumentalities for bodily movement therewith and for pivotal movement relative thereto about an axis substantially paralleling the rotational axis of the form, means limiting the pivotal movement of the support member in one direction to locate such member substantially in alignment with the ply material receiving surface of the form and in another direction to locate such member in a predetermined retracted position, and means carried by one of the instrumentalities coacting with the mounting means for the support member to pivot the latter to retracted position upon relative movement of the instrumentalities toward one another.

12. In a ply band builder having a rotatable form about which strip ply material is drawn and turning and folding instrumentalities movable relative to one another and relatively toward and away from the form, a support member and means mounting the same on one of the instrumentalities for bodily movement therewith and for pivotal movement relative thereto about an axis substantially paralleling the rotational axis of the form, means limiting the pivotal movement of the support member in one direction to locate such member substantially in alignment with the ply material receiving surface of the form and in another direction to locate such member in a predetermined retracted position, and an element carried by another of the instrumentalities and engageable with the mounting means for the support member upon relative movement together of the instrumentalities to pivot the support member to retracted position.

13. In combination with a rotatable ply band building drum having an annular shoulder portion concentric to the rotational axis of the drum, a support member and means mounting the same substantially within the diameter of the drum shoulder for limited swinging movement about an axis substantially parallel to said drum axis and for bodily shifting movement along its swinging axis, the member being disposed at one limit of its swinging movement to extend substantially as a continuation of the drum axially beyond the drum shoulder to engage and support ply material projecting axially over the drum shoulder.

14. In combination with a rotatable ply band building drum having an annular shoulder portion concentric to the rotational axis of the drum, a structure mounted for relative movement axially toward and away from the drum, a support member pivotally mounted on the movable structure for swinging motion about an axis substantially parallel to said drum axis, and means limiting the swinging motion to position the support member to extend substantially as a continuation of an element of the drum surface.

15. In a ply band builder of the type used in the manufacture of pneumatic vehicle tires, a form having a substantially cylindrical ply receiving surface, means mounting the form for rotation about a generally horizontal axis through the center of the cylinder, an arm and means mounting the arm to swing about a substantially horizontal axis paralleling the rotational axis of the form, said swing axis being located within the cylinder generated by the ply receiving surface of the form, a roller mounted on the arm to turn about an axis spaced from the swing axis of the arm, and stop means limiting the swinging movement of the arm to locate the roller in a ply supporting position wholly within the generated cylinder, the roller including a circumferentially extending element which, when the roller is in said ply supporting position, is substantially tangent to the generated cylindrical surface.

16. In a flat band method of building a cord reinforced rubber tire wherein a strip of rubberized cord ply material is drawn onto a rotating drum to form a ply band having a substantially cylindrical portion disposed in embracing relation about the drum and a circular marginal portion which projects beyond the drum, and while the band is supported on the drum the said projecting marginal portion is moved radially inwardly relative to the cylindrical portion in the wrapping of a circular bead anchorage, the improvement which comprises applying internal support to the projecting marginal portion of the ply material while the ply material is being drawn onto the rotating drum, the support being applied along a line disposed substantially in the cylindrical surface generated by the drum periphery whereby to hold the projecting marginal portion of the ply band substantially to the radius of the cylindrical portion of the band, and thereafter wrapping said marginal portion of the ply band about a bead anchorage while the cylindrical portion of the ply band remains on the drum.

17. In the flat band method of building a cord reinforced rubber tire wherein a strip of rubberized cord ply material is drawn onto a rotating drum to form a ply band having a substantially cylindrical portion disposed in embracing relation about the drum and a circular marginal portion which projects beyond the drum, and while the band is supported on the drum the said projecting marginal portion is moved radially inwardly relative to the cylindrical portion in the wrapping of a circular bead anchorage, the improvement which comprises supporting a circumferentially relatively short part of the projecting marginal portion of the ply material while the latter is being drawn onto the drum, the support being applied along a line disposed substantially in the cylinder generated by the drum whereby to hold said short supported part of the projecting ply material substantially to the radius of the cylindrical portion of the band, and thereafter wrapping said marginal portion of the ply band about a bead anchorage while the cylindrical portion of the ply band remains on the drum.

18. In the flat band method of building a cord reinforced rubber tire wherein strips of bias cord ply material are moved sequentially into superposed relation on a substantially cylindrical drum to form a multiple ply band having a substantially cylindrical portion disposed in embracing relation about the drum and a circular marginal portion which projects beyond the drum, and while the band is supported on the drum the said projecting marginal portion is moved radially inwardly relative to the cylindrical portion in the wrapping of a circular bead anchorage, the improvement which comprises applying internal support to the projecting marginal portion of one of the bias strips while another bias strip is being moved onto the drum about said one internally supported strip, the support being applied along a line disposed substantially in the cylindrical surface generated by the drum periphery whereby to hold the projecting marginal portion of the ply band substantially to the radius of the cylindrical portion of the band, and thereafter wrapping said marginal portion of the ply band about a bead anchorage while the cylindrical portion of the ply band remains on the drum.

19. In the flat band method of building a cord reinforced rubber tire wherein strips of bias cord ply material are moved sequentially into superposed relation on a substantially cylindrical drum to form a multiple ply band having a substantially cylindrical portion disposed in embracing relation about the drum and a circular marginal portion which projects beyond the drum, and while the band is supported on the drum the said projecting marginal portion is moved radially inwardly relative to the cylindrical portion in the wrapping of a circular bead anchorage, the improvement which comprises internally supporting a circumferentially relatively short part of the projecting marginal portion of one of the bias strips while another bias strip is being moved onto the drum about said one internally supported strip, the support being applied along a line disposed substantially in the cylinder generated by the drum whereby to hold said short supported part of the projecting ply material substantially to the radius of the cylindrical portion of the band, and thereafter wrapping said marginal portion of the ply band about a bead anchorage while the cylindrical portion of the ply band remains on the drum.

20. In combination in apparatus for building multiple ply pneumatic tire bands, a substantially cylindrical drum for receiving strips of bias cord ply material in superposed relation and supporting the received material as a band having a substantially cylindrical portion disposed in embracing relation about the drum and a circular marginal portion which projects axially beyond one end of the drum, means mounting the drum for rotation about a substantially horizontal axis in drawing the ply material strips onto the drum, a ply support member, and means mounting said support member for relative axial movement toward and away from said one end of the drum, said support member being disposed substantially wholly within the cylindrical surface developed by the periphery of the drum and having an element disposed substantially in said developed cylindrical surface for engagement with the inside of said projecting circular marginal portion of a ply material band on the drum to support the engaged ply material against radial collapse and to hold such projecting marginal portion substantially to the radius of the said cylindrical portion of the ply material embracing the drum during the drawing of the ply material onto the drum, the axial movement of the mounting means in one direction being effective to shift the support member into position for supporting engagement with the ply material and in another direction being effective to shift the support member away from supporting engagement with the ply material to facilitate folding of the ply material about a bead anchorage.

MAX ENGLER.

REFERENCES CITED

The following references are of record in the file of this patent:

UNITED STATES PATENTS

| Number | Name | Date |
|---|---|---|
| 2,295,542 | Breth | Sept. 15, 1942 |
| 2,455,038 | Breth | Nov. 30, 1948 |
| 2,500,193 | Mallory et al. | Mar. 14, 1950 |
| 2,529,739 | Powers | Nov. 14, 1950 |
| 2,544,390 | Mallory | Mar. 6, 1951 |

FOREIGN PATENTS

| Number | Country | Date |
|---|---|---|
| 117,101 | Australia | June 8, 1943 |